(12) United States Patent
Standke et al.

(10) Patent No.: US 7,261,960 B2
(45) Date of Patent: Aug. 28, 2007

(54) APPARATUS AND METHOD FOR INTERNAL STACK TEMPERATURE CONTROL

(75) Inventors: Michael Standke, Mainz (DE); Ingo Hermann, Mainz (DE)

(73) Assignee: General Motors Corporation, Detroit, MI (US)

( * ) Notice: Subject to any disclaimer, the term of this patent is extended or adjusted under 35 U.S.C. 154(b) by 188 days.

(21) Appl. No.: 10/439,525

(22) Filed: May 16, 2003

(65) Prior Publication Data

US 2004/0229099 A1 Nov. 18, 2004

(51) Int. Cl.
*H01M 8/18* (2006.01)
*H01M 8/12* (2006.01)
*H01M 4/00* (2006.01)
*H01M 10/44* (2006.01)

(52) U.S. Cl. .......................... 429/20; 429/26; 429/40; 429/52

(58) Field of Classification Search ................ 429/20, 429/26, 40, 52
See application file for complete search history.

(56) References Cited

U.S. PATENT DOCUMENTS

| 6,228,341 | B1 * | 5/2001 | Hebert et al. ............... 423/352 |
| 6,861,167 | B2 * | 3/2005 | Wells et al. .................. 429/13 |
| 2002/0136937 | A1 * | 9/2002 | Kelley et al. ................. 429/17 |
| 2003/0190507 | A1 * | 10/2003 | Docter et al. ................. 429/20 |
| 2004/0191131 | A1 * | 9/2004 | Wolf et al. ................. 422/129 |

* cited by examiner

*Primary Examiner*—Susy Tsang-Foster
*Assistant Examiner*—Ben Lewis
(74) *Attorney, Agent, or Firm*—Harness, Dickey & Pierce, P.L.C.

(57) ABSTRACT

A fuel cell includes a cathode layer, an anode layer and a heat exchange plate. The heat exchange plate is in heat exchange relationship with one of the anode layer and cathode layer. The heat exchange plate includes a series of heating channels formed therein. The heating channels have a catalyst coating that promotes an exothermic reaction. The catalyst layer promotes oxidization of hydrogen ($H_2$) thereby releasing heat.

24 Claims, 3 Drawing Sheets

APPARATUS AND METHOD FOR INTERNAL STACK TEMPERATURE CONTROL

FIELD OF THE INVENTION

The present invention relates to fuel cells, and more particularly to a device to reduce fuel cell stack start-up time and maintain fuel cell stack temperature above 0° C.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode. To produce electricity through an electrochemical reaction, a fuel, commonly hydrogen ($H_2$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

For optimum operation, defined as high power output and quick power delivery, fuel cells need a certain operating temperature. Heat generated through the electrochemical reaction increases the operating temperature of the fuel cell. Excess heat is dissipated through a cooling system.

At sub-freezing temperatures (e.g. below 0° C. or 273K), however, starting the fuel cell quickly is more difficult due to frozen water in the fuel cell and the fact that the electrochemical reaction rate in the fuel cell is significantly reduced. This limits current flow and further heating of the fuel cell to the optimum operating temperature.

SUMMARY OF THE INVENTION

Accordingly, the present invention provides a fuel cell including a cathode layer, an anode layer and a heat exchange plate. The heat exchange plate is in heat exchange relationship with one of the anode layer and cathode layer. The heat exchange plate includes a series of heating channels formed therein. The heating channels have a catalyst coating that promotes an exothermic reaction.

In one feature, the fuel cell further includes a polymer electrolyte membrane (PEM) disposed between the cathode layer and the anode layer.

In another feature, the catalyst promotes oxidization of hydrogen ($H_2$) thereby releasing heat.

In still another feature, the heat exchange plate also includes a series of cooling channels formed therein that facilitate coolant flow to regulate a temperature of the fuel cell. The cooling channels are in heat exchange relationship with the heating channels, whereby heat from the exothermic reaction is distributed throughout the heat exchange plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
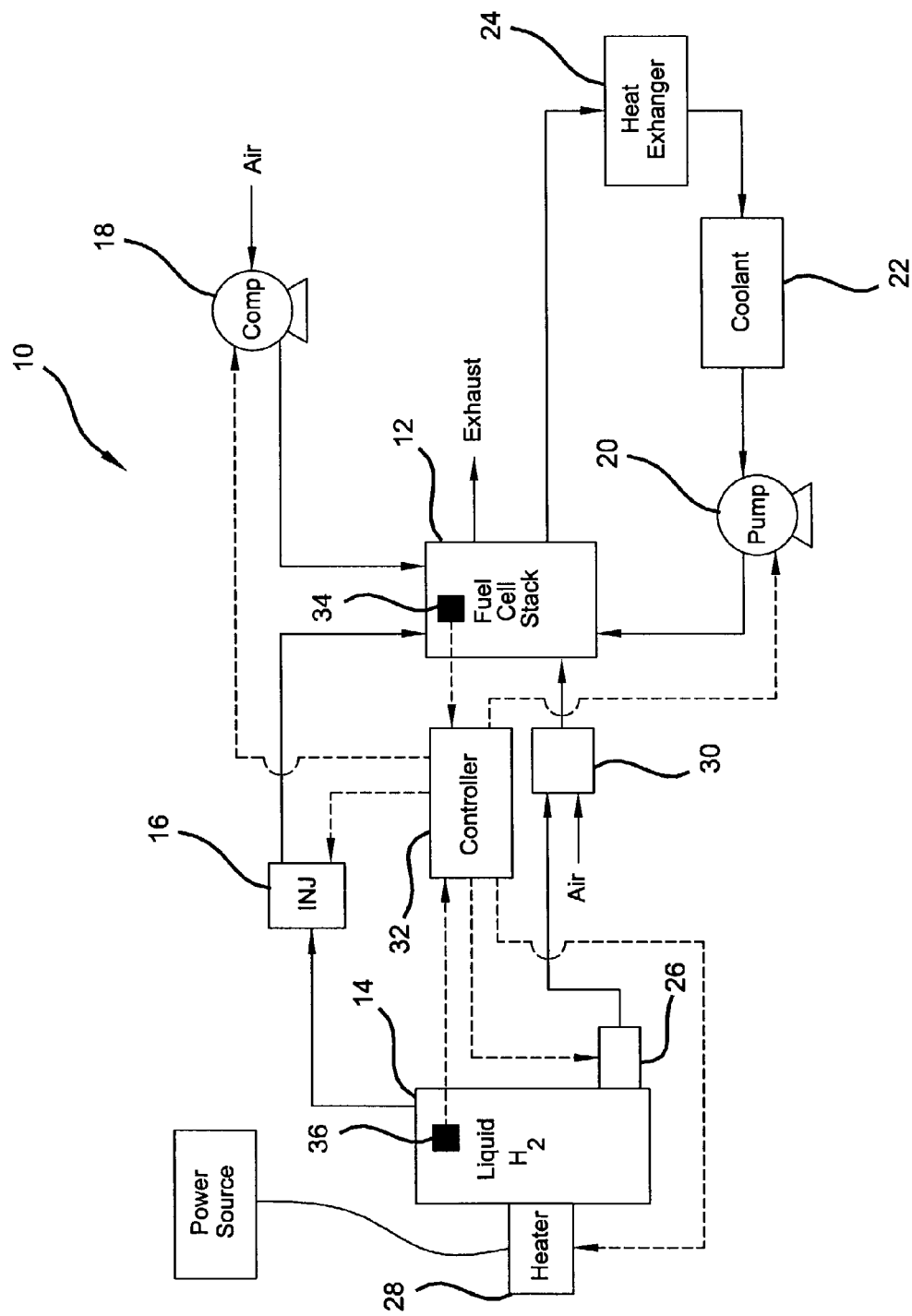
FIG. 1 is a schematic illustration of a fuel cell system according to the principles of the present invention.

Referring now to FIG. 1, a fuel cell system 10 is shown. The fuel cell system 10 includes a fuel cell stack 12 that is supplied with hydrogen ($H_2$) from a hydrogen source 14. An injector 16 facilitates supply of $H_2$ from the hydrogen source 14 to the fuel cell stack 12. A compressor 18 facilitates supply of oxygen ($O_2$) containing air to the fuel cell stack 12. $H_2$ is dissociated at an anode side of the fuel cell stack 12 to generate hydrogen protons ($H^+$) and electrons ($e^-$). The protons are transported through to a cathode side of the fuel cell stack 12 and the electrons flow through an electrical load (not shown). $O_2$ at the cathode side reacts with protons ($H^+$) and electrons ($e^-$) are taken up to form water ($H_2O$). $H_2O$ is exhausted from the fuel cell stack 12.

The reaction at the cathode side is exothermic. The heat generated by the exothermic reaction warms the fuel cell stack 12 to a desired operating temperature. The operating temperature is preferably 80° C. However, at 20° C. sufficient current is immediately available from the fuel cell stack 12 to power the load.

Coolant is circulated through the fuel cell stack 12 to maintain the operating temperature of the fuel cell stack 12. Initially, during the start-up phase whereby the fuel cell stack 12 is warming up to the desired operating temperature, the coolant circulates the heat to uniformly warm the fuel cell stack 12. Once the fuel cell stack 12 achieves the desired operating temperature, the coolant maintains the temperature of the fuel cell stack 12. A pump 20 pumps coolant through the fuel cell stack 12 from a coolant source 22. The coolant is in heat exchange relationship with the various components of the fuel cell stack 12. The coolant exiting the fuel cell stack 12 flows through a heat exchanger 24 where the excess heat from the fuel cell stack 12 is discharged to a heat sink, such as atmosphere.

The fuel cell system 10 further includes an exemplary flow regulator 26 associated with the hydrogen source 14. The exemplary flow regulator 26 can include a pressure relief valve. As pressure within the hydrogen source 14 exceeds a threshold pressure, $H_2$ is exhausted through the flow regulator 26 to reduce the pressure within the hydrogen source 14. A heater 28 is associated with the hydrogen source 14 and is operable to heat the hydrogen source 14. Heating of the hydrogen source induces an increased pressure condition therein. The exhausted $H_2$ is fed into the fuel cell stack 12 through a flow control device 30. In one example, the flow control device 30 includes a venturi nozzle that concurrently draws in $O_2$ containing air from atmosphere. The $O_2$ containing air mixes with the gaseous $H_2$ and is fed into the fuel cell stack 12. As discussed in further detail below, an exothermic oxidization reaction occurs within the fuel cell stack 12.

A controller 32 is in electrical communication with various components and sensors of the fuel cell system 10. The controller 32 controls operation of the compressors 16,18 and pump 20 to regulate operation of the fuel cell stack 12. A temperature sensor 34 generates a temperature signal indicating the temperature of the fuel cell stack 12. A pressure sensor 36 generates a pressure signal indicating a pressure within the hydrogen source 14. The controller 32 communicates with the relief valve 26 to exhaust $H_2$ when the pressure within the hydrogen source 14 exceeds the threshold pressure. The controller 32 regulates operation of the heater 28 to selectively induce an increased pressure condition within the hydrogen source 14, as discussed in further detail below.

Figure 2:
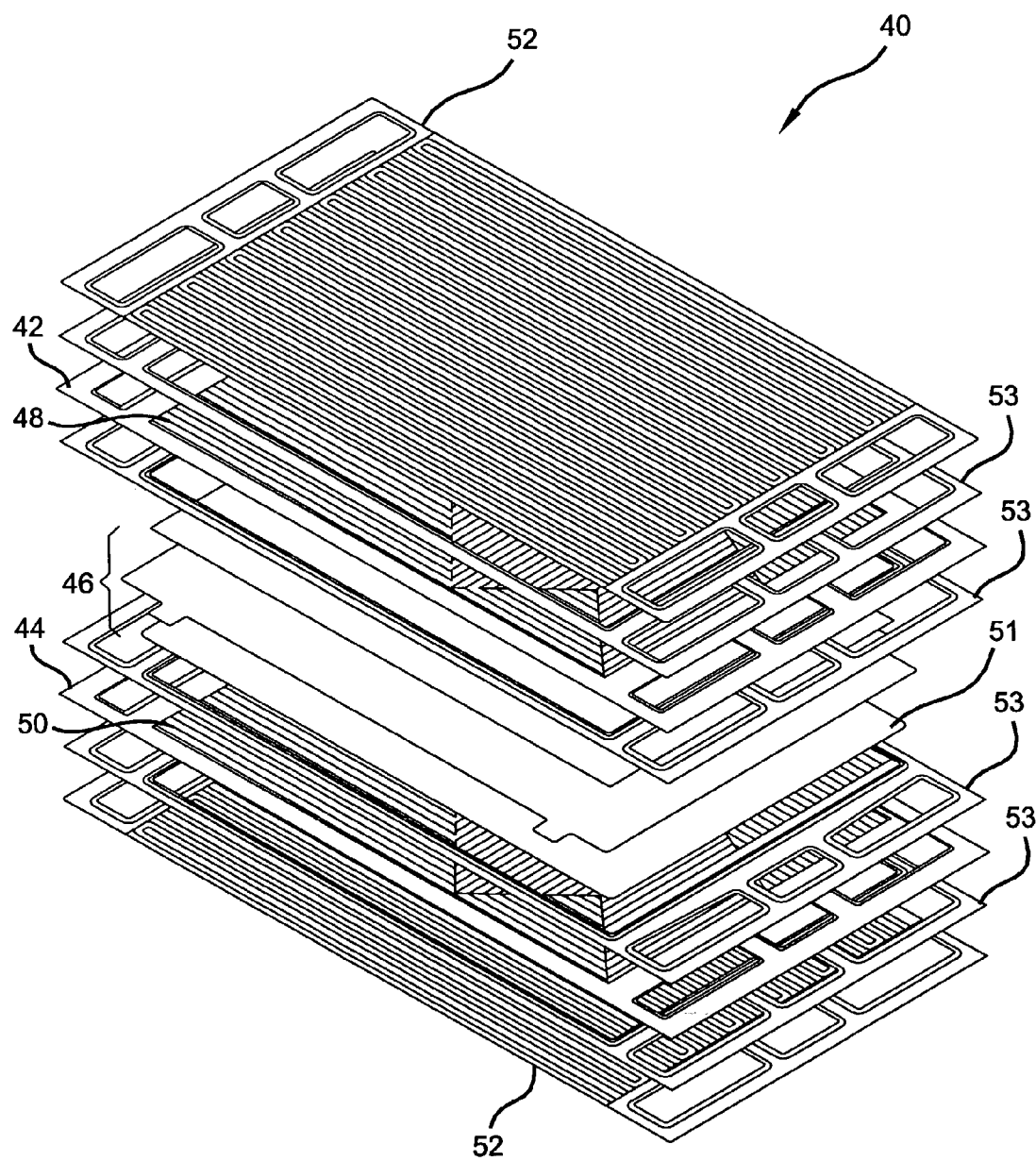
FIG. 2 is a exploded perspective view of an exemplary fuel cell stack.

Referring now to FIG. 2, the fuel cell stack 12 includes a plurality of fuel cells 40 in electrical series connection. Each fuel cell 40 includes a cathode plate 42, an anode plate 44 and a proton exchange membrane (PEM) 46 sandwiched therebetween. The cathode plate 42 includes a series of flow channels 48 formed therein and through which $O_2$ containing air flows. The anode plate 44 includes a series of flow channels 50 formed therein and through which $H_2$ flows. The PEM 46 includes a membrane electrode assembly (MEA) 51 including a thin, proton transmissive, non-electrically conductive, solid-polymer electrolyte membrane. The MEA includes an anode catalyst on one face and a cathode catalyst on another. Heat exchange plates 52 lie adjacent to both the cathode and anode plates 42, 44. The heat exchange plates 52 enable temperature control of the fuel cell stack 12 as described in further detail herein. Seals 53 separate the various plates.

Figure 3:
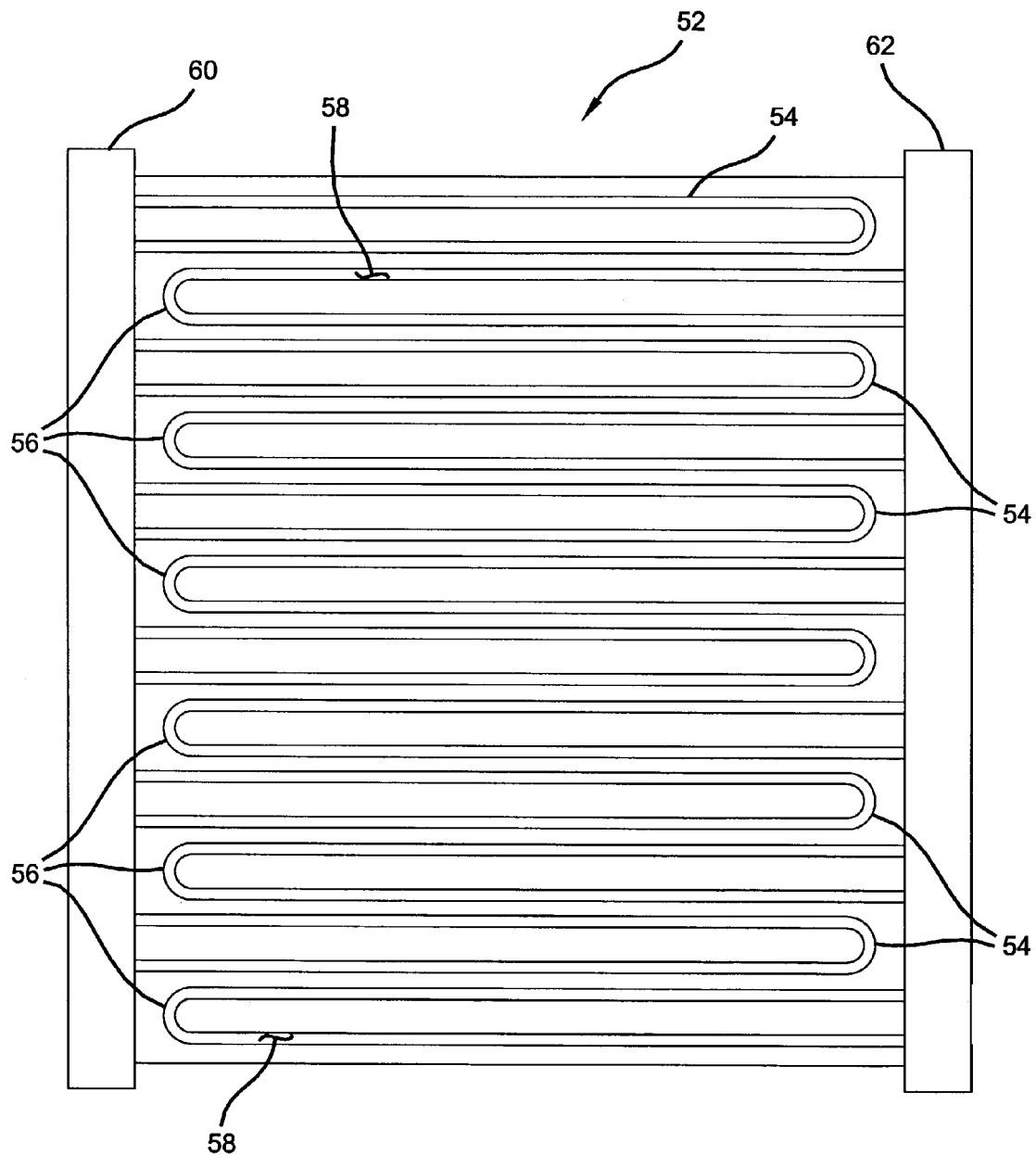
FIG. 3 is a schematic illustration of a heat exchange plate of the fuel cell stack according to the principles of the present invention.

Referring now to FIG. 3, an exemplary heat exchange plate 52 is shown. The heat exchange plate 52 includes a series of cooling channels 54 and a series of heating channels 56. The heating channels 56 are coated with a catalyst layer 58. The catalyst layer 58 can include platinum, palladium, mixtures of both or other material that would induce the oxidization reaction as described in further detail below. The cooling channels 54 are in fluid communication with a coolant header 60 and the heating channels 56 are in fluid communication with a mixture header 62. Coolant flows into the coolant header 60 and is distributed through the cooling channels 54 to uniformly regulate the temperature of the fuel cell stack 12. The coolant is cycled back through the coolant header 60 and out to the heat exchanger 24.

The $H_2$ and $O_2$ mixture flows into the mixture header 62 and is distributed through the heating channels 56. The catalyst layer 58 induces an exothermic oxidization reaction within the heating channels 56. The heat generated by this reaction warms the fuel cell components, as well as the coolant flowing through the cooling channels 54. The warmed coolant uniformly distributes the heat throughout the fuel cell stack 12. In this manner, the heat exchange plates 52 provide a direct heat coupling to the fuel cell stack 12.

The fuel cell system 10 is operable in three main modes: park, start-up and normal operation. Operation of the fuel cell system 10 during each of these modes will be discussed in turn. Park mode is a cool-down period generally occurring after normal operation of the fuel cell system 10. As the fuel cell system 10 initially enters the park mode, boil off $H_2$ is exhausted through the flow regulator 26 and through the flow control device 30 where it is mixed with $O_2$. The $H_2/O_2$ mixture flows into the heating channels 56 and exothermically react to generate heat. The heat initially maintains the temperature of the fuel cell stack 12 as the temperature of fuel cell system 10 drops to ambient.

As discussed above, the fuel cell stack 12 is maintained at a temperature above 0° C. (273K) to avoid freezing of residual $H_2O$ within the fuel cell stack 12. As the effectiveness of the original heat wears off and the temperature of the fuel cell stack 12 drops toward 0° C. (assuming a sub-freezing ambient), the controller 32 switches on the heater 28 to heat the hydrogen source 14. As the hydrogen source 14 is heated, an increased pressure condition results and is detected by the pressure sensor 36. The flow regulator 26 exhausts $H_2$ to the fuel cell stack 12 to relieve the increased pressure condition, inducing a subsequent exothermic reaction. In this manner, as the temperature of the fuel cell stack 12 periodically dips toward 0° C. the fuel cell system 10 initiates the exothermic reaction in the heating channels 56 to avoid sub-freezing temperatures. Although the freezing temperature of water at nominal conditions is 0° C., liquid water in the stack will typically have solids dissolved therein or be subject to pressure variation, resulting in the freezing temperature of water in the stack varying from the nominal value. Thus, the invention is exemplified based on the 0° C. reference for convenience, but a range around same is contemplated. Further, the method of the invention contemplates corrective measures as the temperature of the stack declines toward 0° C., and initiation of corrective measures near and slightly above the freezing temperature of water.

During the start-up mode, the initial temperature of the fuel cell stack 12 is presumably lower than the desired operating temperature. The temperature of the fuel cell stack 12 is sensed by the temperature sensor 34. Although operation of the fuel cell stack 12 increases the temperature to the desired operating temperature, the fuel cell system 10 assists the temperature increase by feeding $H_2$ and $O_2$ into the heating channels 56. As similarly described above, an exothermic reaction occurs within the heating channels 56 resulting in a more rapid temperature increase. Because the heating channels 56 are in heat exchange relation with the cooling channels 54, the heat generated by the reaction warms the coolant. The warmed coolant evenly distributes the heat through the fuel cell stack 12 to warm the fuel cell stack 12 to the desired operating temperature.

Once the fuel cell stack 12 is warmed to the desired operating temperature, as sensed by the temperature sensor 34, normal operation of the fuel cell system 10 ensues. That is to say, the relief valve 26 is closed to inhibit $H_2$ flow into the heat exchange plates 52 through the flow control device 30. The controller 32 regulates operation of the compressors 16, 18 and pump 20 to generate current from the fuel cell stack 12 and to maintain the fuel cell stack 12 at the desired operating temperature.

The fuel cell system 10 of the present invention includes significant advantages over prior art fuel cell systems 10. In particular, the heat exchange plates 52 within the fuel cell stack 12 enable direct heat coupling during the park and start-up modes. This enables a reduction in the start-up time, enabling the fuel cell stack 12 to produce electrical current more quickly and efficiently. Additionally, carrying medium, such as water or oil, and related components, such as pumps, heat exchangers and valves, are eliminated. This provides for a simpler fuel cell system resulting in easier assembly and lower associated costs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
    a cathode layer;
    an anode layer; and
    a single heat exchange plate in heat exchange relationship with one of said anode layer and cathode layer and having a series of cooling channels and a series of heating channels formed therein, wherein each of said series of cooling channels are in fluid connection with a coolant header and each of said series of heating channels are in connection with a mixture header, wherein said heating channels and said cooling channels have separate and isolated contents therein, said heating channels including a catalyst coating that promotes an exothermic hydrogen oxidation reaction, wherein said cooling channels are adjacent to said heating channels, all cooling channels and heating channels lie within a single plane of said heat exchange plate, all cooling channels and heating channels have the same directional orientation, and said heat exchange plate modulates temperature of the fuel cell during park, start-up, and normal operation.

2. The fuel cell of claim 1, further comprising a polymer electrolyte membrane (PEM) disposed between said cathode layer and said anode layer.

3. The fuel cell of claim 1 wherein said cooling channels facilitate coolant flow to regulate a temperature of the fuel cell.

4. The fuel cell of claim 3 wherein said cooling channels are in heat exchange relationship with said heating channels, whereby heat from said exothermic reaction is distributed throughout said heat exchange plate.

5. A system for modulating a temperature of one or more fuel cells in a fuel cell stack, comprising:
    a single heat exchange plate in heat exchange relationship with one of an anode and a cathode of the fuel cell and having a series of cooling channels and a series of heating channels formed therein, wherein each of said series of cooling channels are in fluid connection with a coolant header and each of said series of heating channels are in connection with a mixture header, wherein said heating channels and said cooling channels have separate and isolated contents therein, said heating channels including a catalyst coating that promotes an exothermic hydrogen oxidation reaction, wherein said cooling channels are adjacent to said heating channels, all cooling channels and heating channels lie within a single plane of said heat exchange plate, all cooling and heating channels have the same directional orientation, and said heat exchange plate modulates temperature of the fuel cell during park, start-up, and normal operation; and
    a hydrogen source selectively supplying hydrogen ($H_2$) to said series of heating channels, said $H_2$ reacting with oxygen in said exothermic reaction.

6. The system of claim 5, wherein said hydrogen source supplies said $H_2$ based on a temperature of the fuel cell stack.

7. The system of claim 5, further comprising a flow regulator selectively supplying said $H_2$ from said hydrogen source to said series of heating channels.

8. The system of claim 7, wherein said flow regulator is modulated based on a pressure of said hydrogen source.

9. The system of claim 8, further comprising a heater that heats said hydrogen source to increase said pressure thereby increasing flow of said $H_2$ through said flow regulator.

10. The system of claim 7, wherein said flow regulator is a valve.

11. The system of claim 7, wherein said flow regulator is a relief valve.

12. The system of claim 5, further comprising a venturi nozzle through which said $H_2$ flows, said venturi nozzle drawing in oxygen ($O_2$) to mix with said $H_2$.

13. The system of claim 5, further comprising a series of cooling channels formed in said heat exchange plate and having a coolant flow therethrough to regulate temperature of the fuel cell stack.

14. The system of claim 13, wherein said cooling channels are in heat exchange relationship with said heating channels, whereby said coolant acts as a medium to circulate heat generated by said exothermic reaction.

15. A method of modulating a temperature of a fuel cell stack, comprising:
    feeding hydrogen ($H_2$) into heating channels of the fuel cell stack;
    oxidizing said $H_2$ in said heating channels in an exothermic hydrogen oxidation reaction to generate heat; and
    circulating said heat within the fuel cell stack to vary the temperature thereof using a single heat exchange plate located between an anode and a cathode comprising a series of cooling channels and a series of heating channels formed therein, wherein each of said series of cooling channels are in fluid connection with a coolant header and each of said series of heating channels are in connection with a mixture header, wherein said heating channels and said cooling channels have separate and isolated contents therein, wherein said cooling channels are adjacent to said heating channels, all cooling channels and heating channels lie within a single plane of said heat exchange plate, all cooling channels and heating channels have the same directional orientation, and said heat exchange plate modulates temperature of the fuel cell during park, start-up, and normal operation.

16. The method of claim 15, further comprising monitoring the temperature of the fuel cell stack, wherein said step of feeding $H_2$ into said heating channels is based on the temperature.

17. The method of claim 16, wherein said step of feeding $H_2$ into said heating channels occurs when the temperature is at or below about 0° C.

18. The method of claim 15, further comprising:
    inducing an increased pressure condition in a hydrogen source; and
    exhausting $H_2$ from said hydrogen source to relieve said increased pressure condition and provide said $H_2$ for said feeding of said $H_2$ into said heating channels.

19. The method of claim 18, further comprising monitoring the temperature of the fuel cell stack, wherein said step of inducing an increased pressure condition is based on the temperature.

20. The method of claim 19, wherein said step of inducing an increased pressure condition in said hydrogen source occurs when the temperature is below 0° C.

21. The method of claim 15, further comprising:

channeling said $H_2$ through a venturi nozzle; and drawing oxygen ($O_2$) through said venturi nozzle to mix with said $H_2$.

22. The method of claim 15, further comprising:

feeding coolant into cooling channels of the fuel cell stack; and circulating said coolant within said cooling channels to regulate the temperature.

23. The method of claim 2, wherein said coolant circulates said heat within the fuel cell stack to vary the temperature thereof.

24. The method of claim 16, wherein said heating channels are disposed between two or more fuel cells of said fuel cell stack, and said monitoring of said temperature of said fuel cell stack is accomplished by monitoring the temperature of one or more of said fuel cells.

* * * * *